INVENTOR.
ELMER G. JOHNSON
BY
ATTORNEYS

April 25, 1961 E. G. JOHNSON 2,981,066
TURBO MACHINE
Filed April 12, 1956 7 Sheets-Sheet 2
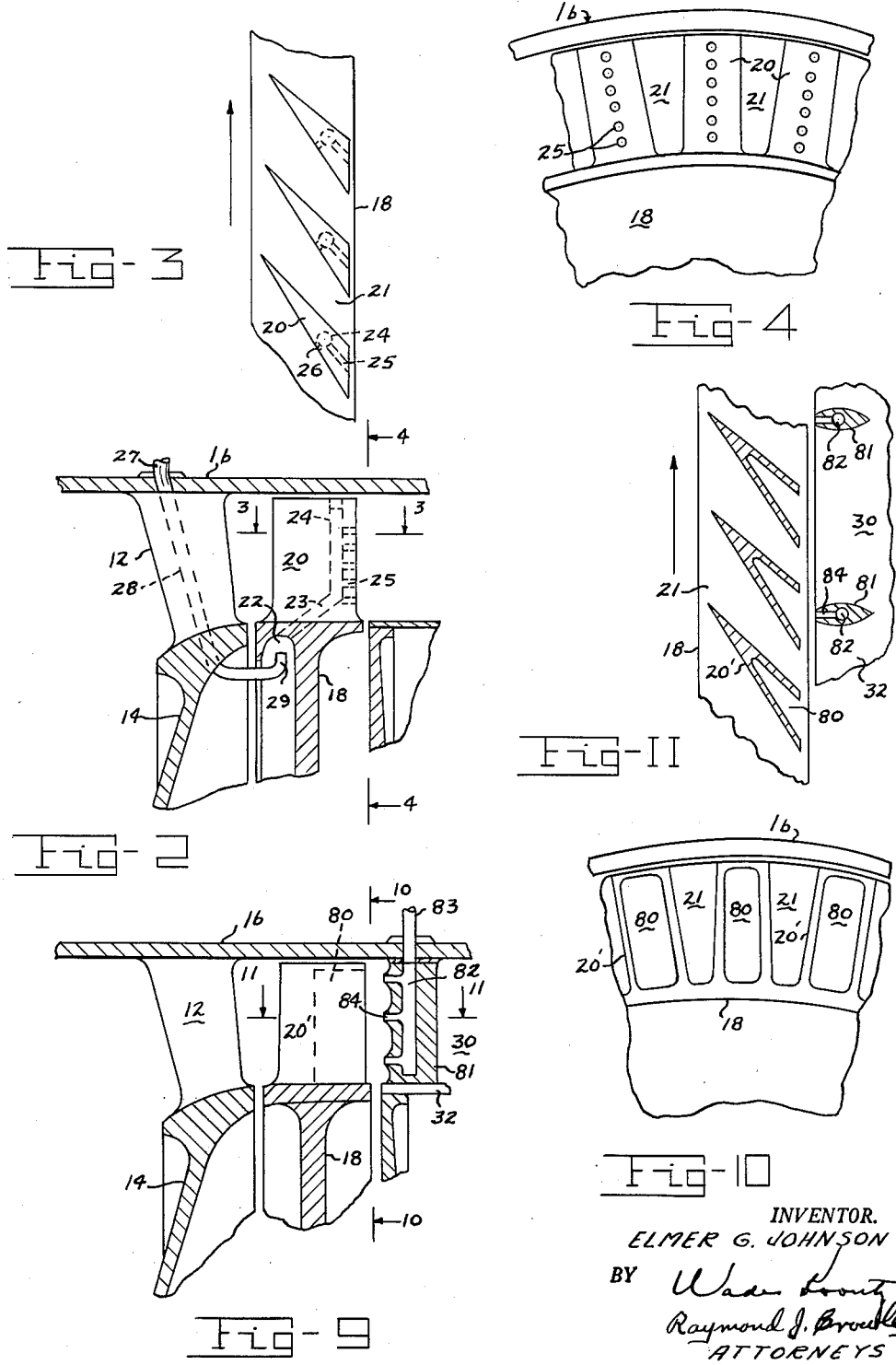
INVENTOR.
ELMER G. JOHNSON
BY
Raymond J. Brockley
ATTORNEYS

INVENTOR.
ELMER G. JOHNSON
BY
ATTORNEYS

INVENTOR.
ELMER G. JOHNSON
BY
ATTORNEYS

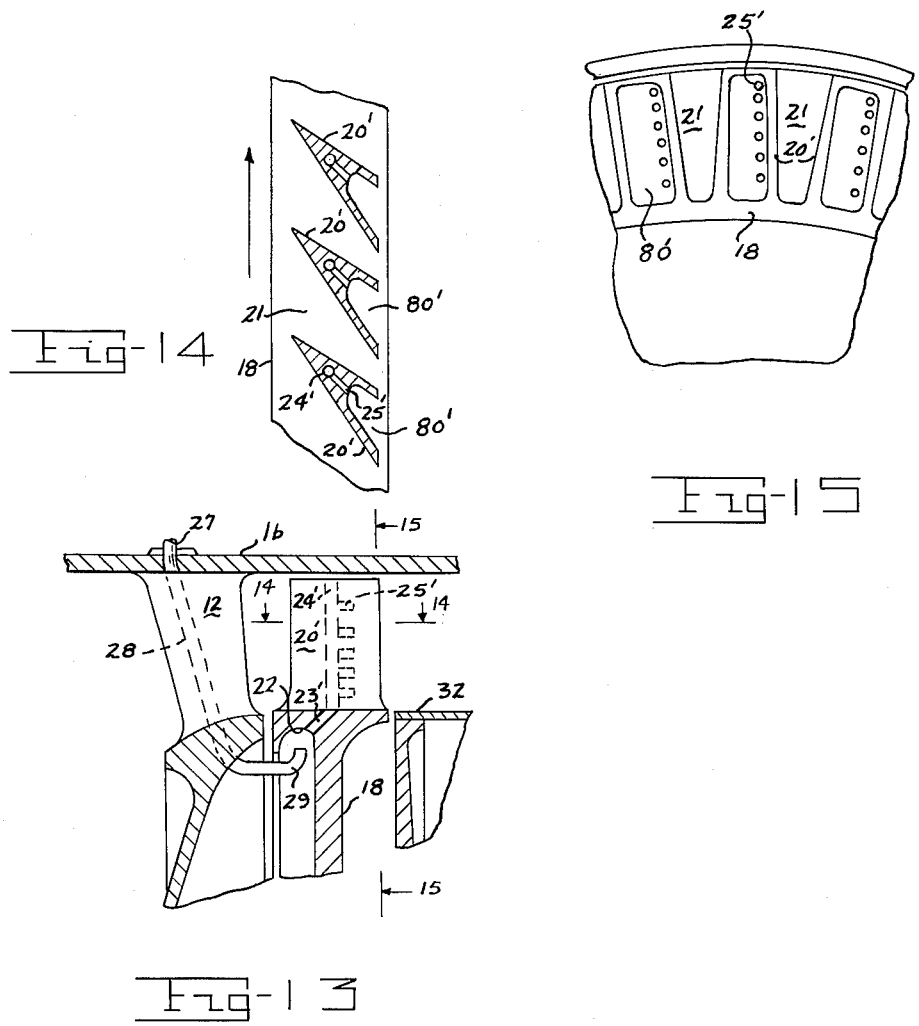

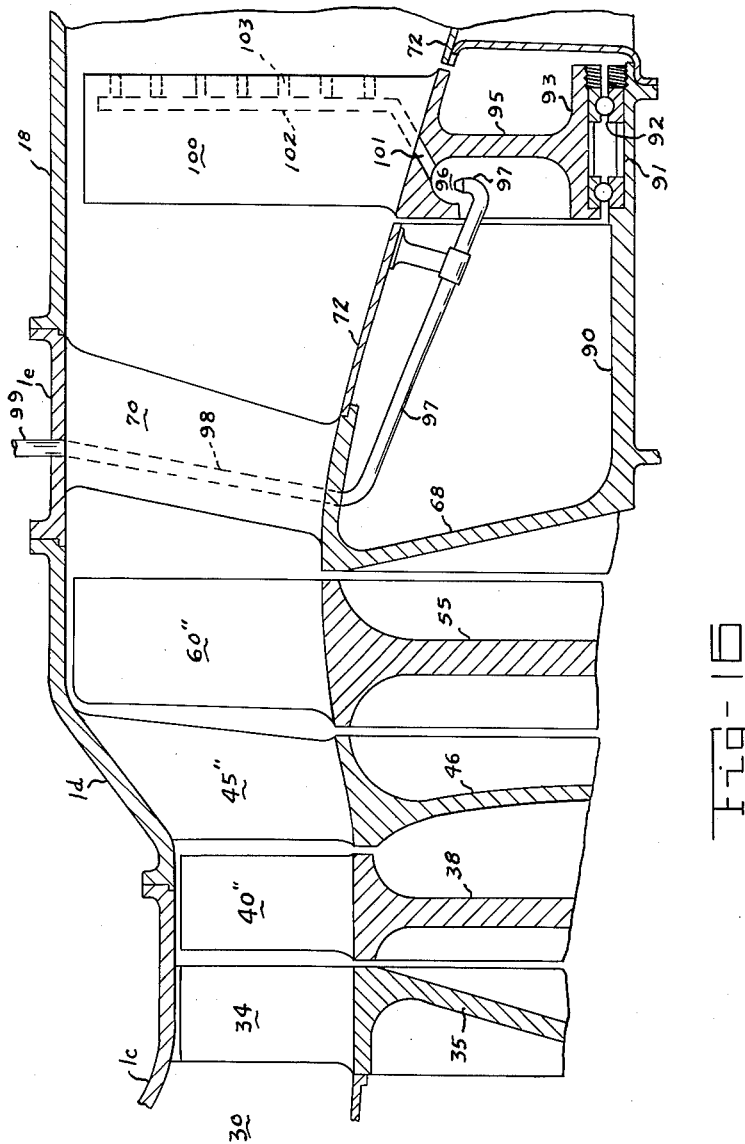

United States Patent Office 2,981,066
Patented Apr. 25, 1961

2,981,066

TURBO MACHINE

Elmer G. Johnson, 54 N. Grand Ave., Fairborn, Ohio

Filed Apr. 12, 1956, Ser. No. 577,902

14 Claims. (Cl. 60—39.74)

(Granted under Title 35, U.S. Code (1952), sec. 266)

The invention described herein may be manufactured and used by or for the United States Government for governmental purposes without payment to me of any royalty thereon.

This invention relates to improvements in gas turbine power plants particularly those of the axial flow type suitable for aircraft propulsion.

In my copending application, Serial No. 537,076, filed September 27, 1955, for Supersonic Fluid Machine, I have disclosed a form of blading for compressors or turbines subject to transonic or supersonic flow. The novel blading is characterized by being in the form of a cascade in which the blades are closely spaced on the rotor so that the space between adjacent blades form flow passages whose shape, or cross sectional area distribution, is a vital factor in the action on the fluid flow therethrough. A blade cascade as contemplated in accordance with the invention employs lateral passage widths which do not exceed the chord of the blades and in which the maximum thickness of the airfoil section of the blades is of the order of one-third of the blade pitch or spacing measured on the circumference of the rotor at the blade tips. The aerodynamic cross section of the blades is further characterized as being in the form of an aerodynamic half body, i.e. where there is a marked discontinuity or decrease in the airfoil thickness at the point of maximum thickness so that there is no appreciable guidance of the flow by the blades aft of the point of maximum thickness. The flow passages formed between adjacent blades have substantially constant radial dimensions and converge from the passage inlets to the passage outlets. The flow is such as to leave large wakes behind the blades, the boundaries of which form the continuation of the blade profiles and which automatically vary with the back pressure. The losses in the wakes are of a surprisingly low value and rotors with the improved blading operate from the subsonic into the supersonic regions with good efficiency.

Aerodynamic blading in accordance with my copending application in general takes the form of a triangular wedge inclined to the plane of rotation and having a sharp entrance edge with the base portion forming the trailing edge with a width of the order of one third the blade pitch and with the pressure and suction faces being either flat or curved. The blading may also have modified forms.

In accordance with the present invention one or more bladed rotors in accordance with my aforesaid application, S.N. 537,076, are employed in the turbo machine in combination with means for spraying fuel into the wakes formed behind the blades. Since the wakes are turbulent zones of air at low velocity they inherently form zones ideal for mixing and combustion of fuel. The blades may be made hollow and open on their base sides to form flame holders. Fuel spray passages may be formed in the blades or stationary spray means may be employed to spray the fuel into the wakes behind the blades.

In accordance with the invention a supersonic rotor having blading as described is positioned to discharge directly into the combustion chamber and by injecting fuel into the wakes behind the blades the combustion then takes place within the combustion chamber.

By employing the combination of blading and means for spraying fuel in conjunction with one or more turbine stages additional reheat fuel may be added and in lieu thereof the invention may be applied to a free running rotor for distributing fuel as an after burner.

A further feature of the invention lies in the fact that when employed in the compressor, shock waves are formed in the blade passages such that when a small quantity of fuel is sprayed into the blade passages, as well as into the wakes behind the blades, combustion will be initiated in the blade passages and will ignite the combustible mixture in the wakes.

Other features of the invention will become apparent by reference to the detailed description taken in conjunction with the appended drawings in which:

Fig. 2 is an enlarged view of the supersonic portion of the compressor of Fig. 1;

Fig. 3 is a view taken on line 3—3 of Fig. 2;

Fig. 4 is a view taken on line 4—4 of Fig. 2;

Fig. 9 is a view similar to Fig. 2 illustrating a modified form of feeding fuel in the compressor of Fig. 1;

Fig. 10 is a view taken on line 10—10 of Fig. 9;

Fig. 11 is a view taken on line 11—11 of Fig. 9;

Fig. 13 is a view similar to Fig. 2 but illustrating a rotating fuel feed with hollow compressor blades acting as flameholders;

Fig. 14 is a view taken on line 14—14 of Fig. 13;

Fig. 15 is a view taken on line 15—15 of Fig. 13; and

Fig. 16 is a side elevation partly in section of a rotary afterburner.

Figure 1:
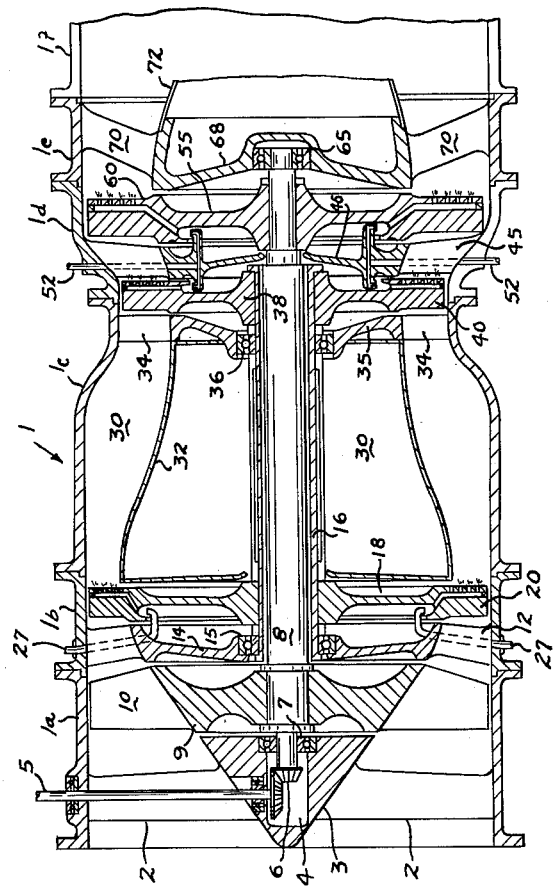
Fig. 1 is a side elevation partly in section of a high thrust jet engine incorporating the invention.

In Fig. 1 there is disclosed a high thrust compact jet engine for aircraft incorporating the features of the invention. Referring to this figure, the reference numeral 1 generally indicates a cylindrical engine housing made in the form of coaxially arranged flanged rings bolted together. The rings 1a and 1b together form the housing for the compressor section. The ring 1c forms the housing for the combustion section. The rings 1d and 1e together form the housing for the turbine section and ring 1f forms the tail pipe or exhaust section.

The housing ring 1a is open at its forward end for the inlet of air. A plurality of radially arranged streamlined struts 2 support an inlet cone 3. The cone 3 is centrally apertured as at 4 to house bevel gears 6 which drive the accessory drive shaft 5 housed in one of the streamline supports 2 and extending outward of the casing to drive the necessary fuel pumps and other accessories not shown.

The inlet cone 3 is bored to house a bearing 7 which serves as the front bearing for a compressor drive shaft 8. A rotor 9 is fixed on shaft 8 and is provided with axial flow compressor blades 10 designed to operate in the transonic region.

The compressor blades 10 are followed immediately downstream by the stator vanes 12 which are secured to the casing 1b at their outer ends and formed integral with a disc 14 which is provided with a central bearing 15 to rotatably support the forward end of a tubular compressor drive shaft 16.

The drive shaft 16 has a rotor disc 18 fixed thereon and which is provided with supersonic blades 20. The rotor 18 (see Fig. 2) is formed on the underside of its rim run with a deep annular groove 22 forming what is known as a slinger ring which communicates by means of inclined passages 23 with vertical passages 24 each drilled vertically in a respective blade 20. The passage 24 plugged at its outer end serves as a manifold to feed fuel to a series of spray passages 25 arranged to spray fuel rearwardly from the base of each blade and also to feed fuel to spray passages 26 arranged to spray fuel laterally into the flow passage space 21 between each pair of adjacent blades (note Fig. 3).

As further illustrated in detail in Figs. 2, 3 and 4, an external fuel conduit 27 connects with drilled passage 28 in the stator blades 12 and in turn connects with a conduit 29 which terminates within the slinger ring groove 22. Fuel delivered at a controlled rate from external conduit 27 will pass by way of passages 28 and conduits 29 to the slinger ring 22. Rotation of rotor 18 will cause fuel in the slinger ring 22 to pass due to centrifugal force into feed passages 23 and 24 and to issue as a spray from passages 25 and 26.

As seen in Fig. 1 combustible mixture discharged from the supersonic blading 20 of rotor 18 enters an annular combustion chamber generally indicated by the reference numeral 30 and defined by housing ring 1c forming its outer wall and the annulus 32 defining the inner wall. The combustion chamber 30 terminates in nozzle vanes 34 secured to the periphery of flanged disc 35 which centrally houses a bearing 36 which serves as the rear journal for the hollow compressor drive shaft 16.

The first supersonic turbine stage formed by the rotor 38 and integral turbine vanes 40 is fixed on the rear end of the hollow shaft 16 and drives the same, in turn driving the supersonic compressor rotor 18 in a counterclockwise direction looking from the front. The turbine rotor 38 (see Fig. 5) has the underside of its peripheral rim formed with a slinger ring groove 42 which connects with vertical passages 43, one drilled in each turbine blade 40. Each passage 43 communicates with a plurality of small lateral spray passages 44 which function to spray fuel into the wakes formed behind the turbine blades in the same manner as in the compressor section as previously described.

The turbine rotor 38 is followed by a stator, including stator vanes 45, secured at their outer periphery to casing ring 1d and formed integral with the stationary disc 46 suitably centrally apertured for passage of the shaft 8 therethrough.

Figure 5:
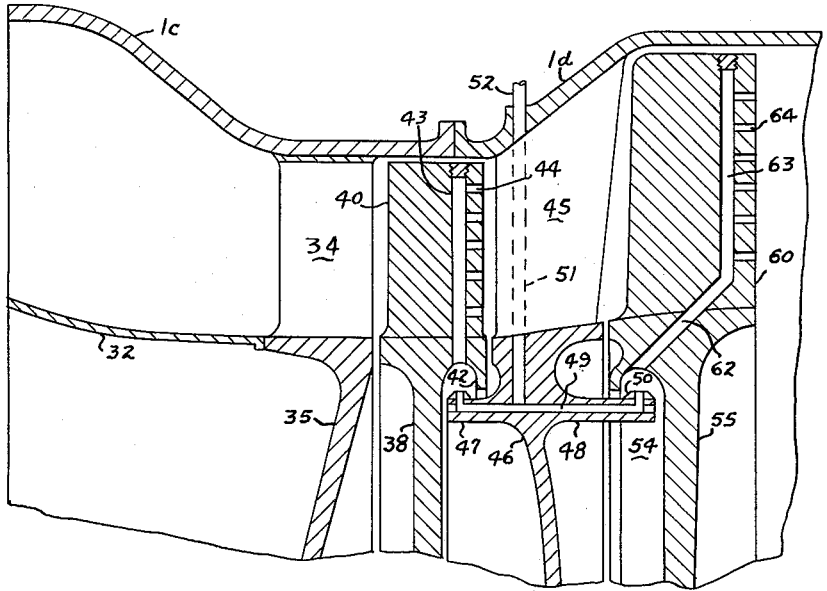
Fig. 5 is an enlarged view of the turbine section of Fig. 1.

As seen in detail in Fig. 5, the stator disc 46 is provided with laterally extending portions 47 and 48 provided with one or more transverse drilled passages 49 terminating in nozzles 50. The passages 49 communicate with vertical passages 51 passing through one or more stator blades 45 and terminating in an external fuel supply conduit 52 which may be connected to a manifold, not shown, containing fuel under pressure and by means of which a definite rate of fuel flow may be established. Fuel delivered by nozzles 50 discharges into slinger ring 42 and into a similar slinger ring groove 54 formed in the rotor 55 of the second stage turbine having supersonic type blades 60 in accordance with the invention mounted thereon. Lateral passages 62 connect slinger ring groove 54 to vertical passages 63, one in each turbine blade, and which connect with a plurality of spray passages 64 in each blade which spray fuel into the wakes behind the turbine blades 60. Fuel delivered at a controlled rate from conduit 52 passes by way of nozzles 50 to slinger rings 42 and 54 from whence by centrifugal force, due to turbine rotation, fuel will be sprayed from the respective spray passages 44 and 64 to burn in the hot gases passing through the turbine stages, but due to time lag will burn downstream of the turbines.

The second turbine rotor 55 is fixed on the compressor drive shaft 8 and drives the transonic compressor rotor 9 with blades 10 in a clockwise direction looking from the front so that the compressor stages as well as the turbine rotors are independently driven and contrarotating.

The downstream end of the compressor shaft 8 is journalled in a bearing centrally housed in a flanged disc 68 secured by means of streamlined supports 70 from the casing ring 1e. The flanged ring 68 serves also as a mounting for a conventional tail cone 72 which extends into the tail pipe portion of the housing ring 1f.

Figure 6:
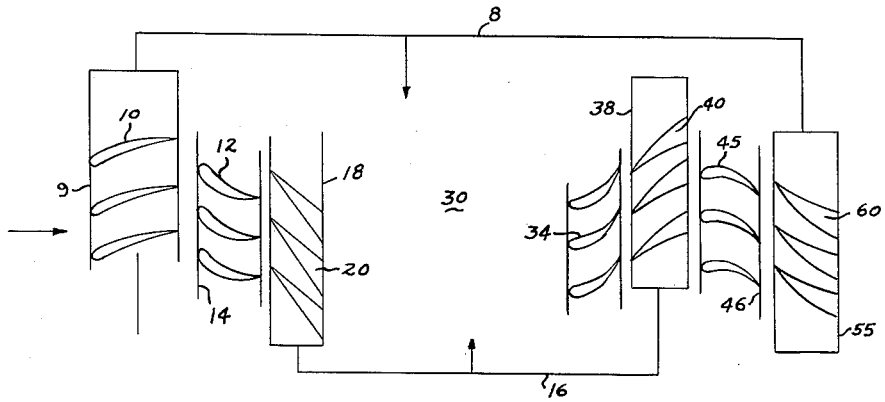
Fig. 6 is a schematic diagram of the blading arrangement of the engine of Fig. 1.

By reference to Fig. 6 it will be seen that the transonic compressor rotor 9 and blades 10 are driven by shaft 8 from turbine rotor 55 and blades 60 in a clockwise direction looking from the front. Similarly the supersonic compressor rotor 18 and blades 20 are driven in a counterclockwise sense by turbine rotor 38 having vanes 40. Air entering the compressor blades 9 will leave at a transonic velocity, for example, at a Mach number of eight-tenths or higher and will pass through stator vanes 12 into the passages 21 between compressor blades 20 at a supersonic velocity under optimum operating conditions and will leave at a lower velocity and mix with fuel sprayed into the wakes behind the blades 20. The combustible mixture burning in the low velocity wakes mixes with air in the combustion section 30 and the products of combustion enter the nozzle vanes 34 and into the first turbine blades 40 preferably at supersonic velocity where additional fuel is added in the wakes behind blades 40 and the burning gases will, after passing through stator blades 45, enter the second and contrarotating turbine stage where further reheat fuel is added for combustion in the tail pipe.

Figure 7:
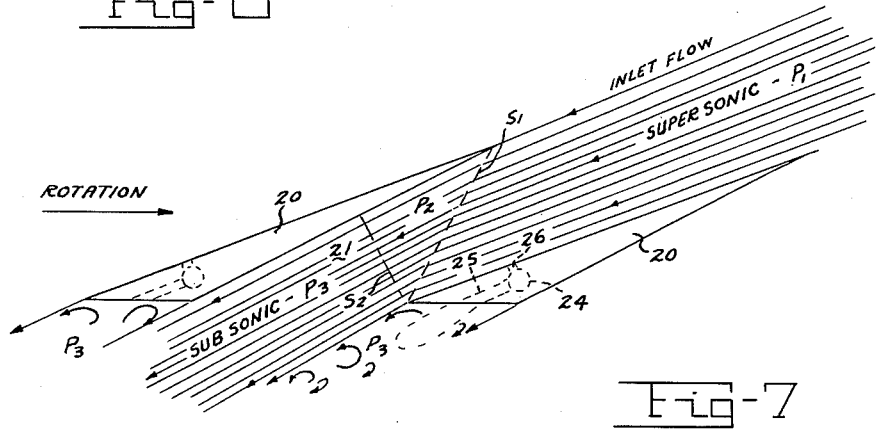
Fig. 7 is an enlarged top plan view of the supersonic compressor blading of Fig. 1 illustrating the flow therethrough.

As seen in Fig. 7, air enters the blade passages 21 between adjacent blades 20 in the supersonic stage of the compressor. The blade passages 21 are characterized by being of substantially constant radial dimensions and converging in the plane of the flow from the passage inlets to their outlets. The velocity of entrance will ordinarily be supersonic at a pressure $P_1$. A shock wave $S_1$ will form at the entering edge of each blade on the pressure side of the triangular wedge-shaped blades. The shock wave $S_1$ will extend across the channel 21 and intersect the suction face of an adjacent blade 20 at a point near the juncture of the suction and base faces of the blade. The pressure behind this shock wave will be $P_2$ and the velocity will be lower than the inlet velocity. Under optimum back pressure conditions a strong shock wave will extend across the flow channel as indicated by $S_2$ with subsonic velocity and pressure $P_3$ prevailing behind the shock wave. Due to the bluff trailing edge or so-called aerodynamic half-body shape large wakes will form behind the trailing edge in which the velocity will be low and the pressure equal to the existing back pressure $P_3$. These wakes form ideal conditions for the burning of fuel. The boundaries of the wakes before separation in essence form a continuation of the airfoil shape of the blades and vary with the existing back pressure which is believed to be the reason that blades of this type can operate in the subsonic, transonic and supersonic ranges with good efficiency and with a wide range on either side of the design point. As seen in this figure, as well as Fig. 2, fuel delivered to passages 24 will spray by means of spray passages 25 directly into the turbulent wakes behind the blades 20 where, due to the low velocity, conditions are ideal for combustion. As further seen in Fig. 7, the spray passages 26 in each blade 20 can spray fuel directly into the blade passage 21 ahead of the shock waves $S_1$ and $S_2$. Due to the temperature rise across the shock wave fronts ignition of the fuel will take place and provide for ignition of the main fuel sprayed into the wakes behind the blades 20. The primary combustion of fuel in the wakes behind the blades 20 may be confined in the main combustion section 30 by means of burner tubes or conical burners of known design, not shown. In lieu of burner tubes baffles may be provided to direct a flow of secondary air along the combustion chamber walls to cool the same in a known manner.

Figure 8:
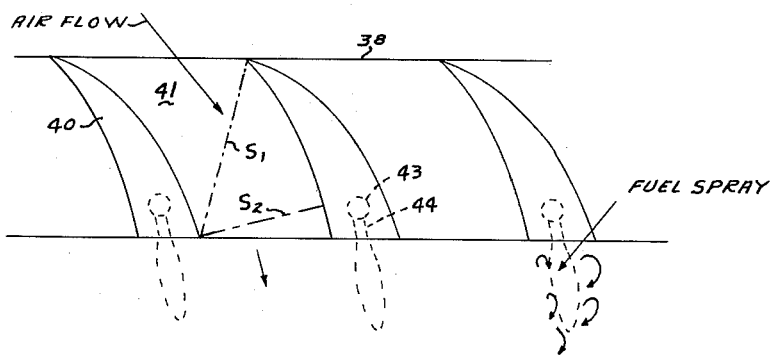
Fig. 8 is a view illustrating typical turbine blading of the device of Fig. 1.

Fig. 8 illustrates a view similar to Fig. 7 of the first turbine rotor 38 and supersonic blading 40. The turbine blades 40 are wedge-shaped with passages 41 of substantially constant radial dimensions and converging from inlet to outlet and differing from the supersonic compressor blading 20 only in that the pressure and suction faces are curved, the blades 60 of the second stage turbine rotor 55 being similar except for being curved in the opposite hand. Shock waves $S_1$ and $S_2$ are formed in the blade passages 41 as described above with respect to the compressor supersonic rotor. Wakes will be formed aft of the bluff trailing edges of the turbine blades and will serve in the same manner for combustion of reheat fuel passing from blade passages 43 and spray passages 44 into the wakes.

A modified form of means for spraying fuel into the wakes behind the supersonic compressor blades is illustrated in Figs. 9 to 11, inclusive. As seen in these figures the compressor rotor 18 is provided with blades 20' having the same configuration as blades 20 of the device of Fig. 1 as shown in Fig. 3 with the exception that the blades are each formed with an internal cavity 80 which is open over substantially the whole of the base portion of the blade. At the entrance to the combustion chamber section 30 a plurality of radially extending streamline struts 81 are positioned. Each strut 81 is provided with a central radial passage 82 which connects with an external wuel pipe 83 adapted to be supplied from a manifold or the like, not shown, with a controlled amount of fuel under pressure. The passage 82 communicates with a plurality of lateral spray passages 84 which spray fuel in an upstream direction and which will enter the cavities 80 in the open base portions of the blades 20'. The cavities 80 form in effect flame holders to support combustion which is completed in the wakes aft of the blades.

Figure 12:
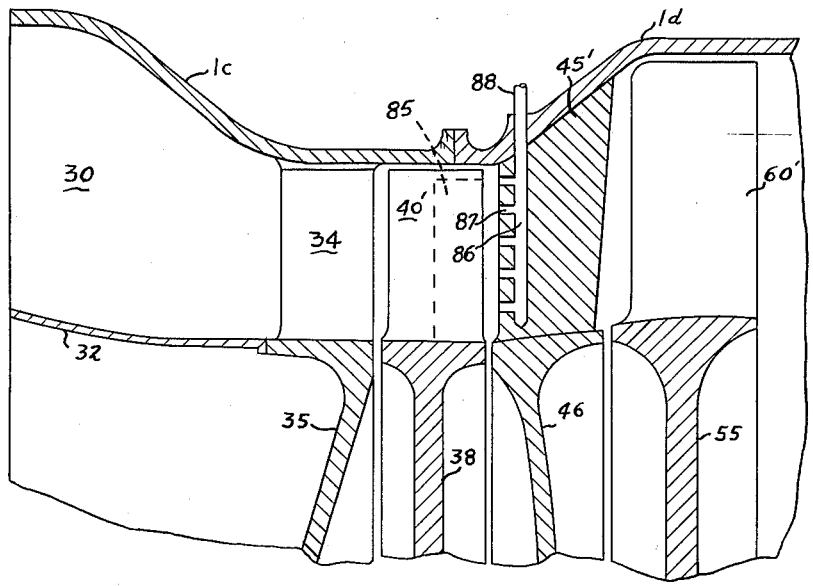
Fig. 12 is a view illustrating a modified form of turbine blade and fuel feeding means for use in the engine of Fig. 1.

Fig. 12 illustrates a fuel feed system identical to that described above with respect to Figs. 9 to 11, inclusive, except that it is applied to one stage of the turbine. As seen in Fig. 12 parts common to Fig. 1 are given the same reference numerals or if altered are indicated by the numerals primed. The first turbine rotor 38 is provided with turbine blades 40' having the same aerodynamic profile as the blades 40 illustrated in Fig. 8. The blades 40' differ however in being provided with internal pockets or cavities 85 identical with the cavities 80 illustrated in Fig. 11 and open on the base side of the blades to serve as flame holders. The stator blades 45' of the same form as the stator blades 45 of Fig. 1 are drilled with a vertical passage 86 which communicates with spray passages 87 which spray fuel forward into the open sides of the turbine blades to be ignited in the pockets 85. The radial fuel feed passage 86 connects to an external fuel supply conduit 88 which may connect to a fuel supply manifold, not shown, for delivery of the desired amount of reheat fuel. It is essential to provide for spraying fuel from a number of stator vanes 45' only sufficient to supply the desired quantity of reheat fuel, the other stator vanes would not be modified. With the turbine section of the engine of Fig. 1 modified as shown in Fig. 12 it is practicable only to use one supersonic stage for spraying fuel into the wakes behind the blades and accordingly the second turbine will preferably have blades 60' made with conventional blade profiles.

It may also be desirable to utilize the benefits of hollow blades acting as flame holders as illustrated in Fig. 9 with respect to the compressor and in Fig. 12 with respect to the turbine section but utilizing the rotating feed of fuel directly into the blade cavities. Such a modified form of the invention generally applicable to either the compressor, turbine or afterburner is illustrated in Figs. 13, 14 and 15 as applied to the compressor. Parts common to the devices shown in Figs. 2 and 9 are indicated by the same reference numerals.

The supersonic rotor 18 of the compressor section is provided with a slinger ring 22 and a fuel feed conduit 27, passage 28 and nozzle 29 exactly the same as in the device of Fig. 1 illustrated in Fig. 2. A lateral feed passage 23' connects a vertical feed passage 24' in each blade 20' to the slinger ring groove 22. Lateral spray passages formed in the blade 20' connect with the vertical feed passage 24' and open into blade cavities 80' formed similar to the cavities 80 illustrated in Figs. 9 to 11. Fuel sprayed from the passages 25' due to rotation of the rotor 18 will enter the cavities 80' and ignite in the blade cavities which will act as flame holders. Combustion will be completed in the wakes formed behind each blade. It is obvious that while illustrated as applicable to the supersonic stage of the compressor the system is equally adapted to one or more of the turbine stages of Fig. 1.

The principles of the invention are also applicable to afterburning fuel downstream of the turbine section and the afterburner construction is illustrated in Fig. 16. As seen in this figure the first turbine blades 40'', intermediate stator vones 45'' and second turbine blades 60'' are of conventional design. The hub portion of the stationary disc 68 is extended rearwardly to form the cylindrical spindle 90 which is shouldered as at 91 to provide a seat for the inner race of an antifriction bearing 92, the outer race of which supports the hub 93 of a free turning rotor 95. The rotor 95 is provided with a slinger ring groove 96 which is fed with fuel at a controlled rate by one or more pipes 97 which are connected to radial passages 98 in the streamlined supports 70, and each in turn connected to an external fuel conduit 99 which may be connected to a fuel manifold, not shown, and supplied with fuel under pressure at a controlled rate.

The rotor 100 is provided with blades similar to the compressor blades 20 (see Fig. 7) except that the blades will be pitched at an angle of close to 90° to the plane of rotation since little turbine effect will be required to drive the rotor 95 to get the desired fuel distribution. The blades will have the same aerodynamic half-body shape in profile as employed in the compressor and turbine as heretofore described.

A lateral passage 101 in each blade 100 connects with the slinger ring groove 96 and feeds fuel into a radial passage 102 in each blade which feeds fuel to the spray passages 103 which spray fuel directly into the wakes behind each blade for combustion in the tail pipe.

It will be apparent that the hollow blades serving as flame holders and rotary fuel feed therefor as shown in the modification, Figs. 13 through 15, is equally applicable to the afterburner construction of Fig. 16.

Under circumstances where gaseous fuels are desired to be employed or where it is desired to employ the fuel as a rotor coolant the slinger ring fuel feed described with reference to the engine disclosed in Fig. 1 is not suitable and a modified fuel feeding system is employed of the type illustrated in Fig. 17.

Figure 17:
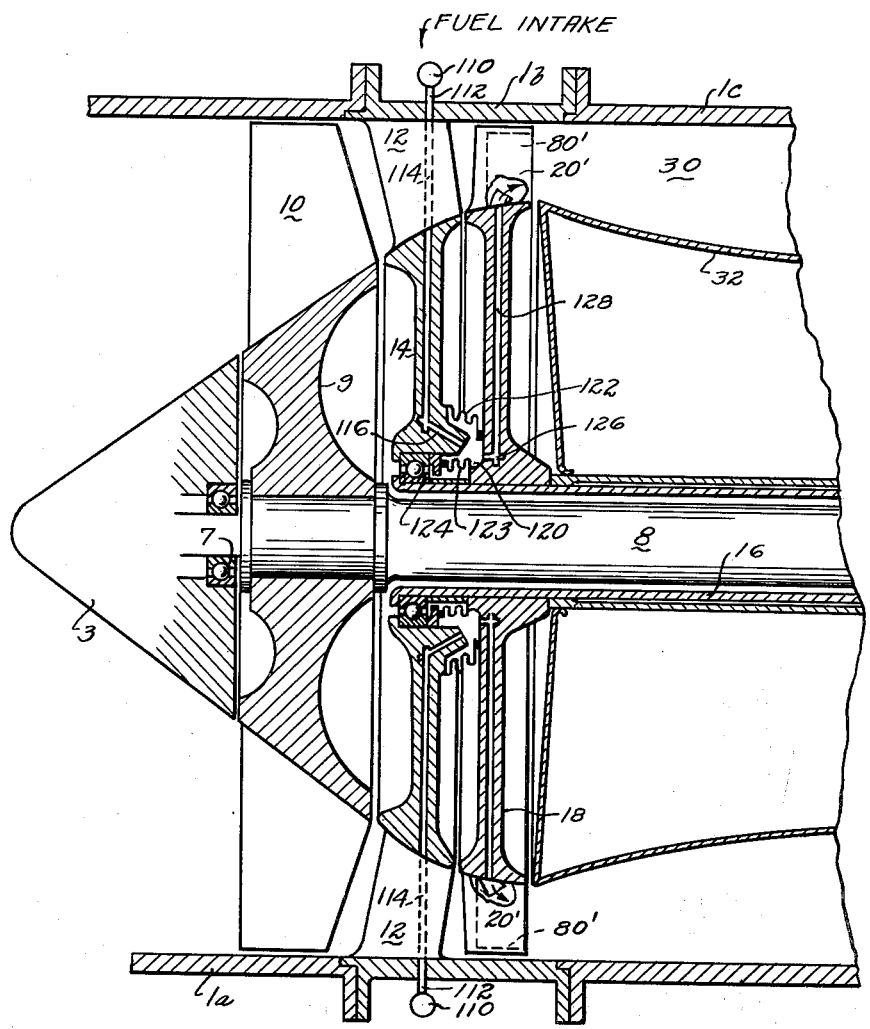
Fig. 17 is a view partly in section illustrating a means for feeding a gaseous fuel in an engine of the type shown in Fig. 1.

Fig. 17 illustrates a fuel feeding system applicable in general to the engine disclosed in Fig. 1 but shown applied to the supersonic stage of the compressor. Parts common to Fig. 1 are given the same reference numerals as applied in that figure.

As seen in Fig. 17 a fuel manifold 110 adapted to be connected to a source of gaseous fuel under pressure (not shown) is connected in parallel to individual fuel conduits 112 which in turn respectively connect to fuel passages 114 formed in the stator vanes 12 and supporting disc 14. Each passage 114 communicates by means of a lateral passage 116 with a chamber 120. The chamber 120 is defined by an outer bellows type carbon seal having one end secured to the stationary disc 14 and having its outer end contacting the face of rotor disc 18 in sealing relation and by a similar inner bellows seal 123 secured to and rotating with rotor 18 and sealingly engaging a stationary ring 124 adjacent the bearing 15.

The bellows chamber 120 communicates with lateral passages 126 formed in the rotor 18 which in turn each communicate with a respective passage extending vertically through the disc portion of rotor 18 and communicating at its outer end with the internal cavity 80' formed in the supersonic compressor rotor blades 20' of the same type as disclosed in Figs. 9 to 11, inclusive.

Gaseous fuel entering the bellows chamber 120 under pressure will pass by way of passages 126 and 128 into the cavities 80' in the supersonic compressor blades 20' where the fuel will be ignited, the blade cavities 80' acting as flame holders. The burning fuel will emerge from the blade cavities 80' and enter the combustion chamber 30.

The arrangement shown in Fig. 17 is applicable also for use with liquid fuel with the exception that spray passages such as 25' shown in Fig. 13 may be employed to spray the fuel into the flame holding blade cavities 80'.

While described with respect to the feeding of fuel through the supersonic stage of the compressor the method of feeding fuel of Fig. 17 can be applied to the turbine or to the afterburner. As employed in the claims the term "spraying liquid fuel" will be considered to embrace the distribution of fuel in either liquid or gaseous form.

I claim:

1. In an axial flow gas turbine machine of the character described, means for introducing fuel into the air stream flowing through said machine for combustion therein comprising a bladed rotor, at least one stage of the blades on said rotor being adapted for transonic and supersonic flow, the blades of said stage defining a cascade having fluid flow passages therebetween effective to alter the rotational component of the fluid flow therethrough, the blades of said rotor stage having their maximum thickness adjacent the exit ends of the flow passages and of the order of one-third the blade spacing, the blade thickness decreasing abruptly from the point of maximum thickness so as to produce a divergent flow with large wakes behind the blades at the point of flow separation substantially equal to the maximum blade thickness and a means for spraying fuel into the zones of the wakes formed in the flow behind the blades of the rotor.

2. In an axial flow gas turbine machine of the character described, means for introducing fuel into the air stream for combustion therein comprising, a bladed rotor at least one stage of the blades on said rotor being adapted for transonic and supersonic flow, the blades of said one stage defining a cascade having fluid flow passages therebetween effective to alter the rotational component of the fluid flow therethrough, the radial dimensions of the flow passages being substantially constant from the flow passage entrances to the passage exits and the flow passages converging laterally from the flow passage entrances to the exits therefrom, the blades of said one stage being substantially in the form of triangular wedges inclined to the axis of rotation with sharp entrance edges and the base portion of the wedges being substantially the point of maximum thickness of the blades and of the order of one-third the blade spacing so that the flow through the flow passages form large wakes behind each blade and means for introducing fuel into the wakes behind the blades.

3. The structure as claimed in claim 2, in which the means for introducing fuel into the wakes behind the blades comprises stationary fuel nozzles positioned behind the blade row and adapted to direct fuel spray upstream of the direction of gas flow through the flow passages of said bladed rotor.

4. The structure as claimed in claim 1, in which the means for spraying liquid fuel into the wakes behind the rotor blades comprises passages in the rotor extending into the blades and spray orifices in the blades communicating with said passages and adapted to spray liquid fuel directly into the wakes formed behind the rotor blades.

5. In an axial flow gas turbine machine of the character described having an axial flow compressor and a combustion section receiving air delivered by the compressor, said combustion section having an annular entrance positioned immediately downstream from the exit of a supersonic bladed rotor forming the final stage of the axial flow compressor, said bladed rotor having the blades thereon inclined to the plane of rotation and providing flow passages therebetween of substantially constant radial dimensions but converging laterally from entrance to exit, the blades having sharp entrance edges and increasing in thickness from the entering edges to a maximum thickness and then abruptly decreasing in thickness to cause a flow separation with corresponding large wakes in the flow entering the annular entrance of the combustion section and means for introducing fuel into the wakes formed in the flow downstream of the final compressor stage.

6. The structure as claimed in claim 5, in which the means for introducing fuel comprise fuel flow passages formed in the supersonic compressor rotor and spraying orifices rotatable with and housed within the rotor blades connected to the fuel flow passages and arranged to spray the liquid fuel directly into the wakes formed behind the blades.

7. The structure as claimed in claim 5, in which the blades of the supersonic rotor are each formed with a cavity directly open to the air stream behind the blades at the point of maximum blade thickness and communicating with the flow wakes at their origin and liquid fuel spraying means positioned in the blade cavities and adapted to spray fuel into the turbulent wakes formed behind the blades, said blade cavities forming stabilizing flame holders at the entrance of the combustion section.

8. In a gas turbine machine of the character described a bladed turbine rotor adapted to receive fluid flow in the transonic and supersonic velocity range, said turbine blades being adapted to alter the rotational component of the fluid flow therethrough and forming a cascade with flow passages between adjacent blades of substantially constant radial dimensions and converging from passage inlet to passage exit, the blades having their maximum thickness adjacent the passage exits and with the maximum thickness of the order of one third of the blade spacing, said blades presenting a bluff body appearance when viewed from the rear, the aerodynamic flow through said passages leaving large wakes behind the blades and means for spraying fuel into the wakes behind the blades for combustion therein.

9. The structure as claimed in claim 8 in which the turbine blades are provided with cavities open over the whole of the trailing edge and serving as flame holders for the combustion of fuel in the wakes behind the blades.

10. In an axial flow gas turbine machine of the character described a bladed rotor, the blades on said rotor being spaced to provide flow passages therebetween of substantially constant radial dimensions but converging from passage entrance to exit, said rotor blades having their maximum thickness equal to approximately one-third of the blade pitch and the point of maximum thickness being substantially at the trailing edge, said blades being hollow to form cavities open over substantially the whole of the trailing edge and means for injecting fuel into the hollow blade cavities for combustion therein and in the wakes formed behind the blades.

11. The structure as claimed in claim 10 in which the means for injecting fuel into the blade cavities comprises spray passages in the blades communicating with the blade cavities and means rotating with the rotor and formed therein for transferring fuel to the spray passages.

12. The structure as claimed in claim 10, in which the means for injecting fuel into the hollow blade cavities comprise a plurality of spray nozzles positioned downstream of the rotor and adapted to spray fuel upstream into the blade cavities as they pass the spray nozzles.

13. In an axial flow gas turbine of the character described, a compressor and a combustion chamber, said compressor having a supersonic stage immediately in front of the combustion chamber and adapted to discharge the compressor output directly therein, said supersonic stage including a rotor having blades thereon inclined to the plane of the rotor and characterized in having a maximum thickness of the order of one-third the blade chord and the point of maximum thickness being substantially at the trailing edge, said blades have flow passages therebetween of substantially constant radial dimensions and converging from passage entrance to passage exit and said blades when operating in high velocity flow giving rise to at least one shock wave extending across each flow passage, a fuel feeding passage in each blade, means in the rotor for supplying fuel to the feeding passage, spray passages in the blades connected to each respective feeding passage and adapted to spray fuel into the flow passages between the blades so as to be ignited by the shock wave and further spray passages in each blade connected with a respective feed passage for injecting a main portion of the fuel into the flow wakes behind each blade.

14. In a gas turbine machine having a compressor, a combustion section and turbine, means for afterburning fuel in the exhaust gases from the turbine comprising a bladed rotor mounted for free rotation and driven by turbine action resulting from the rotational component in the gases discharged by the turbine, the blades on said rotor having sharp leading edges and with the point of maximum thickness adjacent the trailing edge and of the order of one-third the blade chord, the aerodynamic flow over the blades causing large wakes aft of the trailing edge of the blades, spray passages in the blades for injecting fuel into the wakes behind the blades and means for feeding fuel through the rotor to the spray passages.

References Cited in the file of this patent

UNITED STATES PATENTS

| | | |
|---|---|---|
| 2,579,049 | Price | Dec. 18, 1951 |
| 2,672,011 | Von Zborowski | Mar. 16, 1954 |
| 2,720,750 | Schelp | Oct. 18, 1955 |
| 2,784,551 | Karlby | Mar. 12, 1957 |
| 2,880,573 | Karcher | Apr. 7, 1959 |

FOREIGN PATENTS

| | | |
|---|---|---|
| 727,796 | Great Britain | Apr. 6, 1955 |
| 288,547 | Switzerland | Sept. 1, 1953 |